United States Patent
Marupaduga et al.

(10) Patent No.: US 10,575,216 B1
(45) Date of Patent: Feb. 25, 2020

(54) SYSTEMS AND METHODS FOR SCHEDULING RESOURCES FOR RELAY NODES IN A WIRELESS NETWORK

(71) Applicant: Sprint Spectrum LP, Overland Park, KS (US)

(72) Inventors: Sreekar Marupaduga, Overland Park, KS (US); Nitesh Manchanda, Overland Park, KS (US); Vanil Parihar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 15/825,869

(22) Filed: Nov. 29, 2017

(51) Int. Cl.
*H04L 1/00* (2006.01)
*H04W 28/20* (2009.01)
*H04W 28/02* (2009.01)
*H04W 72/12* (2009.01)

(52) U.S. Cl.
CPC ....... *H04W 28/20* (2013.01); *H04W 28/0205* (2013.01); *H04W 28/0268* (2013.01); *H04W 28/0284* (2013.01); *H04W 28/0289* (2013.01); *H04W 72/12* (2013.01)

(58) Field of Classification Search
None
See application file for complete search history.

(56) References Cited

U.S. PATENT DOCUMENTS

| | | | |
|---|---|---|---|
| 7,440,761 B2 | 10/2008 | Matsukura et al. | |
| 9,088,988 B1* | 7/2015 | Park | H04W 72/0486 |
| 9,232,516 B1* | 1/2016 | Oroskar | H04W 36/06 |
| 9,265,053 B2 | 2/2016 | Blankenship et al. | |
| 10,159,014 B1* | 12/2018 | Parihar | H04W 28/08 |
| 2009/0196194 A1* | 8/2009 | Paloheimo | H04L 45/26 370/252 |
| 2011/0235569 A1* | 9/2011 | Huang | H04W 28/02 370/315 |
| 2011/0268014 A1* | 11/2011 | Mildh | H04B 7/155 370/315 |
| 2012/0170508 A1* | 7/2012 | Sawai | H04B 7/155 370/315 |
| 2012/0207079 A1* | 8/2012 | Wang | H04W 28/0284 370/315 |
| 2013/0044674 A1* | 2/2013 | Teyeb | H04B 7/15542 370/315 |
| 2013/0090055 A1* | 4/2013 | Pitakdumrongkija | H04B 7/15 455/9 |
| 2016/0174263 A1* | 6/2016 | Webb | H04W 74/0833 370/329 |
| 2018/0220327 A1* | 8/2018 | Karampatsis | H04W 28/0252 |

* cited by examiner

*Primary Examiner* — Phirin Sam (57) ABSTRACT

A system for scheduling resources in a wireless network is provided. The system includes an access node configured to deploy a first radio air interface. The system also includes a relay node configured to attach to the first radio air interface and to deploy a second radio air interface to which one or more end-user wireless devices are attached. The system further includes a processor configured to perform operations including determining an indicator of congestion at the relay node, prioritizing traffic based on the indicator of congestion and a channel bandwidth between the relay node and the access node, and scheduling resources based on the prioritized traffic.

20 Claims, 8 Drawing Sheets

SYSTEMS AND METHODS FOR SCHEDULING RESOURCES FOR RELAY NODES IN A WIRELESS NETWORK

TECHNICAL BACKGROUND

Wireless networks incorporating access nodes, relay nodes, and other small-cell access nodes are becoming increasingly common, and may be referred to as heterogeneous networks. Relay nodes improve service quality by relaying communication between an access node, and end-user wireless devices in the wireless network. For example, relay nodes may be used at the edge of a coverage area of an access node to improve and/or extend coverage and/or service, as well as in crowded areas having a high number of other wireless devices to increase the available throughput to the end-user wireless devices being relayed. Relay nodes are generally configured to communicate with the access node (e.g., a "donor" access node) via a wireless backhaul connection, and to deploy a radio air interface to which end-user wireless devices can attach. Donor access nodes generally include scheduling modules or schedulers for scheduling resources to wireless devices directly or indirectly connected thereto, as well as to the wireless backhaul connections for the various relay nodes connected thereto.

Variations in types of relay nodes, and/or resource usage thereof by end-user wireless devices, may not be efficiently accounted for by a donor access node. For example, different relay nodes are configured to deploy their respective wireless air interfaces using different transmit powers, which results in varying numbers of end-user wireless devices that attach thereto, which can alter the resource usage of each relay node differently. These (and other) variations in resource requirements between differently-configured relay nodes can result in sub-optimal allocation of resources for the respective backhaul connections of each relay node, thereby affecting the quality of service delivered to end-user wireless devices connected thereto.

OVERVIEW

Exemplary embodiments described herein include systems, methods, and processing nodes for scheduling resources for relay nodes in a wireless network. An exemplary system described herein for scheduling resources for relay nodes in a wireless network includes an access node configured to deploy a first radio air interface. The system also includes a relay node configured to attach to the first radio air interface and to deploy a second radio air interface to which one or more end-user wireless devices are attached. The system further includes a processor configured to perform operations including determining an indicator of congestion at the relay node, prioritizing traffic based on the indicator of the congestion and a channel bandwidth between the relay node and the access node, and scheduling resources based on the prioritized traffic.

An exemplary method described herein for scheduling resources for relay nodes in a wireless network includes determining an indicator of congestion at a relay node. The method also includes prioritizing traffic based on the indicator of congestion and a channel bandwidth between the relay node and an access node. The method further includes scheduling resources based on the prioritized traffic.

An exemplary processing node described herein for scheduling resources for relay nodes in a wireless network is configured to perform operations including determining an indicator of congestion at a relay node, prioritizing traffic based on the indicator of congestion and a channel bandwidth between the relay node and an access node, and scheduling resources based on the prioritized traffic.

DETAILED DESCRIPTION

Exemplary embodiments described herein include systems, methods, and processing nodes for scheduling resources towards wireless backhaul connections for relay nodes based on a configuration of the relay nodes. An exemplary system described herein includes at least a donor access node, such as an eNodeB, and a relay node in wireless communication with the donor access node. The relay node may be configured to relay data packets between the donor access node and an end-user wireless device attached to the relay node. For the purposes of this disclosure, a relay node generally includes a first component for communicating with the donor access node via a wireless backhaul connection (hereinafter, "backhaul") and a second component for deploying a wireless air interface. End-user wireless devices can attach to the wireless air interface deployed by the relay node to access network services from the donor access node. For example, the first component may include a wireless device for communicating via the backhaul (hereinafter, "relay wireless device" or "relay user equipment" or "Relay UE") that is coupled with a small-cell access node (hereinafter "relay access point") to which the end-user wireless devices may attach. Alternatively, the first and second components may be combined into a single relay node device.

Due to spectrum limitations, network operators may not allocate sufficient channel bandwidth to relay UE at a relay node. This may lead to congestion on the backhaul for the relay access point (e.g., a mini-macro access point) at the relay node, and impacts Guaranteed Bit Rate (GBR) related users in the absence of traffic prioritization. The disclosed systems and methods apply a traffic prioritization scheme at the relay node (e.g., at the relay wireless device) based on resource block utilization at the relay access point and channel bandwidth of the relay UE. In some embodiments, the access node may determine an indicator of congestion at the relay node. The indicator of congestion may be based on a number of physical resource blocks (PRBs) or based on a number of actively connected wireless devices at the relay node. Based on the indicator of congestion and a channel bandwidth assigned to the relay node, the access node may prioritize the traffic at the relay node, and schedule resources based on the prioritized traffic.

For example, in some embodiments, the access node may determine the number of PRBs needed at the relay access point of the relay node, and compare the number of PRBs needed with an assigned number of PRBs corresponding to the assigned channel bandwidth between the relay node and the access node. If the assigned number of PRBs is less than the PRBs needed, the relay node (e.g., the relay UE) may identify GBR related traffic and prioritizes the GBR related traffic over non-GBR related traffic. In some embodiments, based on a utilization rate of the PRBs, the access node may allocate more resources to the GBR related traffic as compared to non-GBR related traffic.

As another example, in some embodiments, the access node may determine the number of actively connected wireless devices at the relay node, and compare the number with a threshold number. If the number of actively connected wireless devices is greater than the threshold number, the relay node (e.g., the relay UE) may identify GBR related traffic and prioritizes the GBR related traffic over non-GBR related traffic. In some embodiments, based on a utilization rate of the PRBs, the access node may allocate more resources to the GBR related traffic as compared to non-GBR related traffic.

Prioritizing GBR related traffic over non-GBR related traffic may include assigning a higher priority to GBR related traffic and a lower priority to non-GBR related traffic, even when the default priority level of the non-GBR related traffic may be higher than the default priority level of the GBR related traffic. In some embodiments, the access node may dynamically assign or adjust a channel bandwidth between a relay node and the access node based on the prioritized traffic. For example, when a relay node is experiencing a great amount of prioritized GBR related traffic, the access node may increase the channel bandwidth of the relay node. The disclosed systems and methods may enable more effective utilization of network resources when a relay node or access node is congested.

In addition to the systems and methods described herein, the operations for scheduling resources for the relay nodes may be implemented as computer-readable instructions or methods, and processing nodes on the network for executing the instructions or methods. For example, a processing node coupled to a donor access node, a scheduler within the donor access node, a scheduler in a relay node, or a controller node may be configured to perform the operations described herein. These and other embodiments are further described with reference to FIGS. 1-8.

Figure 1:
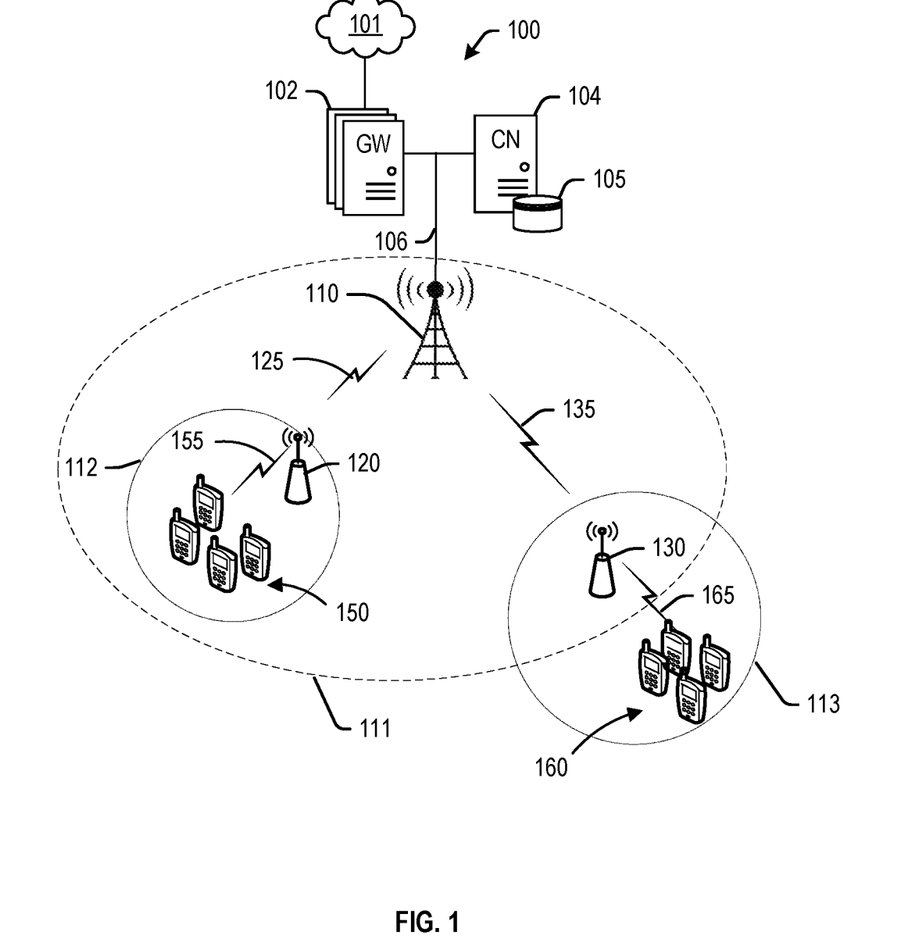
FIG. 1 depicts an exemplary system for scheduling resources for relay nodes in a wireless network.

FIG. 1 depicts an exemplary system for scheduling resources for relay nodes in a wireless network. System 100 may include a communication network 101, a gateway 102, a controller node 104, an access node 110, one or more relay nodes (e.g., relay nodes 120 and 130), and one or more end-user wireless devices (e.g., end-user wireless devices 150 and 160). In this exemplary embodiment, access node 110 may be a macro-cell access node configured to deploy a wireless air interface over a coverage area 111. Each of relay nodes 120, 130 may be configured to communicate with access node 110 over wireless communication links 125, 135, respectively (hereinafter, "wireless backhaul" or simply "backhaul"). Each of relay nodes 120, 130 may be further configured to deploy additional wireless air interfaces over coverage areas 112, 113, respectively. Wireless devices 150 may be configured to attach to the wireless air interface deployed by relay node 120, and wireless devices 160 may be configured to attach to the wireless air interface deployed by relay node 130. In some embodiments, wireless devices 150, 160 may access network services using the combination of relay nodes 120, 130 and wireless backhaul links 125, 135. In some embodiments, wireless devices 150, 160 may access network services by directly connecting to access node 110. As shown in FIG. 1, wireless devices 160 are illustrated as being located outside of coverage area 111 of access node 110. Wireless devices 160 may access network services from access node 110 by connecting to relay node 130. In this configuration, access node 110 may be referred to as a "donor" access node. In other embodiments, any other combination of donor access nodes, relay access nodes, and carriers deployed therefrom may be evident to those having ordinary skill in the art in light of this disclosure.

Access node 110 may be any network node configured to provide communication between end-user wireless devices 150, 160 and communication network 101, including standard access nodes such as a macro-cell access node, a base transceiver station, a radio base station, an eNodeB device, an enhanced eNodeB device, or the like. In an exemplary embodiment, a macro-cell access node 110 may have a coverage area 111 in the range of approximately five kilometers to thirty-five kilometers and an output power in the tens of watts. Relay nodes 120, 130 may include short range, low power, small-cell access nodes such as a microcell access node, a picocell access node, a femtocell access node, or a home eNodeB device. In addition, relay nodes 120, 130 may include a small-cell access node paired with a relay wireless device configured to communicate over one of wireless backhaul links 125, 135, respectively.

Access node 110 and relay nodes 120, 130 may each include a processor and associated hardware circuitry configured to execute or direct the execution of computer-readable instructions to perform operations such as those described herein. Briefly, access node 110 and relay nodes 120, 130 may retrieve and execute software from a storage device, which may include a disk drive, a flash drive, a memory circuitry, or other memory device, and which may be local or remotely accessible. The software may include computer programs, firmware, or other form of machine-readable instructions, and may include an operating system, utilities, drivers, network interfaces, applications, or other type of software, including combinations thereof. Access node 110 and relay nodes 120, 130 may receive instructions and other input at a user interface. Access node 110 may communicate with gateway 102 and controller node 104 via communication links 106, 107. Access node 110 and relay nodes 120, 130 may communicate with each other, and other access nodes (not shown), using a wireless link or a wired link such as an X2 link. Components of access node 110 and relay nodes 120, 130 are further described with reference to FIGS. 2-5.

Wireless devices 150, 160 may be any device, system, combination of devices, or other such communication platform configured to wirelessly communicate with access node 110 and/or relay nodes 120, 130 using one or more frequency bands deployed therefrom. Each of wireless devices 150, 160 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that may send and receive signals or data. Other types of communication platforms are contemplated.

Communication network 101 may be a wired and/or wireless communication network. Communication network 101 may include processing nodes, routers, gateways, and physical and/or wireless data links for communicating signals among various network elements. Communication network 101 may include one or more of a local area network, a wide area network, and an internetwork (including the Internet). Communication network 101 may be capable of communicating signals, for example, to support voice, push-to-talk, broadcast video, and data communications by wireless devices 150, 160. Wireless network protocols may include one or more of Multimedia Broadcast Multicast Services (MBMS), code division multiple access (CDMA) 1×RTT (radio transmission technology), Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), Third Generation Partnership Project Long Term Evolution (3GPP LTE), Fourth Generation broadband cellular (4G, LTE Advanced, etc.), and Fifth Generation mobile networks or wireless systems (5G or 5G LTE). Wired network protocols utilized by communication network 101 may include one or more of Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 may include additional base stations, controller nodes, telephony switches, internet routers, network gateways, computer systems, communication links, or other type of communication equipment, and combinations thereof.

Communication links 106, 107 may use various communication media, such as air, laser, metal, optical fiber, or other signal propagation path—including combinations thereof. Communication links 106, 107 may be wired or wireless and may use various communication protocols such as Internet, Internet protocol (IP), local-area network (LAN), optical networking, hybrid fiber coax (HFC), telephony, T1, or other communication format—including combinations thereof. Wireless communication links may be a radio frequency, microwave, infrared, or other signal, and may use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. In some embodiments, communication links 106, 107 may include S1 communication links. Other wireless protocols may also be used. Communication links 106, 107 may be a direct link or may include various intermediate components, systems, and networks. Communication links 106, 107 may enable different signals to share the same link.

Gateway 102 may be a network node configured to interface with other network nodes using various protocols. Gateway 102 may communicate data (e.g., data related to a user) over system 100. Gateway 102 may be a standalone computing device, computing system, or network component, and may be accessible, for example, by a wired or wireless connection, or through an indirect connection such as through a computer network or communication network. For example, gateway 102 may include a serving gateway (SGW) and/or a public data network gateway (PGW), etc. One of ordinary skill in the art would recognize that gateway 102 is not limited to any specific technology architecture, such as Long Term Evolution (LTE), and may be used with any network architecture and/or protocol.

Gateway 102 may include a processor and associated hardware circuitry configured to execute or direct the execution of computer-readable instructions to obtain information. Gateway 102 may retrieve and execute software from a storage device, which may include a disk drive, a flash drive, or a memory circuitry or device, and which may be local or remotely accessible. The software may include computer programs, firmware, or other form of machine-readable instructions, and may include an operating system, utilities, drivers, network interfaces, applications, or other type of software, including combinations thereof. Gateway 102 may receive instructions and other input at a user interface.

Controller node 104 may be a network node configured to communicate information and/or control information over system 100. For example, controller node 104 may be configured to transmit control information associated with a handover procedure. Controller node 104 may be a standalone computing device, computing system, or network component, and may be accessible, for example, by a wired or wireless connection, or through an indirect connection such as through a computer network or communication network. For example, controller node 104 may include one or more of a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE), and may be used with any network architecture and/or protocol.

Controller node 104 may include a processor and associated hardware circuitry configured to execute or direct the execution of computer-readable instructions to obtain information. Controller node 104 may retrieve and execute software from a storage device, which may include a disk drive, a flash drive, a memory circuitry or device, and which may be local or remotely accessible. In an exemplary embodiment, controller node 104 may include a database 105 configured for storing information related to elements within system 100, such as configurations and capabilities of relay nodes 120, 130, resource requirements of end-user wireless devices 150, 160, priority levels associated therewith, and so on. The information may be requested by or shared with access node 110 via communication links 106, 107, X2 connections, and so on. The software may include computer programs, firmware, or other form of machine-readable instructions, and may include an operating system, utilities, drivers, network interfaces, applications, or other type of software, and combinations thereof. For example, a processing node may be included in controller node 104 and configured to perform the operations described herein. In some embodiments, controller node 104 may receive instructions and other input at a user interface.

Other network elements may be included in system 100 and configured to facilitate communication but are omitted for clarity, such as base stations, base station controllers, mobile switching centers, dispatch application processors, and location registers such as a home location register or visitor location register. Furthermore, other network elements that are omitted for clarity may be included in system 100 to facilitate communication, such as additional processing nodes, routers, gateways, and physical and/or wireless data links for carrying data among the various network elements, e.g., between access node 110 and communication network 101.

Figure 2:
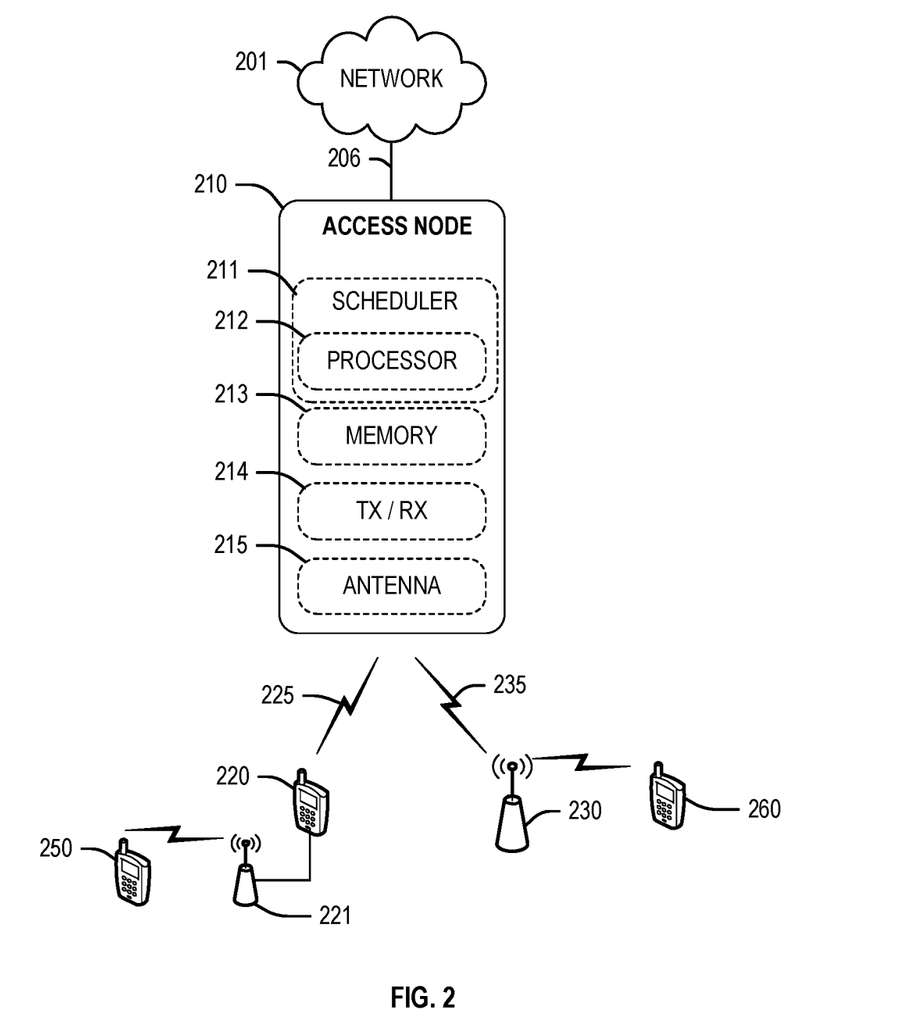
FIG. 2 depicts an exemplary access node.

FIG. 2 depicts an exemplary access node 210. Access node 210 may include, for example, a macro-cell access node, such as access node 110 described with reference to FIG. 1. Access node 210 may be an embodiment of access node 110. Access node 210 is illustrated as including a scheduler 211, which may include a processor 212. Access node may also include a memory 213, a transceiver 214, and an antenna 215. Scheduler 211 may be configured to schedule resources for relay nodes communicatively coupled to the access node. For example, processor 212 of scheduler 211 may be configured to execute instructions stored on memory 213 for performing various methods disclosed herein for scheduling resources for the relay nodes. Transceiver 214 and antenna 215 may be configured to enable wireless communication with relay wireless device 220 and relay node 230. Instructions stored on memory 213 may be accessed and executed by processor 212 to perform operations disclosed herein, such as deploying a wireless air interface via one or more of transceiver 214 and antenna 215, enabling relay wireless device 220 and relay node 230 to access network services from network 201 via access node 210, and to communicate with end-user wireless devices 250, 260 via relay wireless device 220, a relay access point 221, and relay node 230, respectively. Relay wireless device 220 and relay access point 221 may be referred to as a relay node. Although memory 213 is shown as separated from scheduler 211, in some embodiments, memory 213 may be included in scheduler 211. Alternatively, scheduler 211 may include an additional memory. In some embodiments, access node 210 may be referred to as a donor access node.

Figure 3:
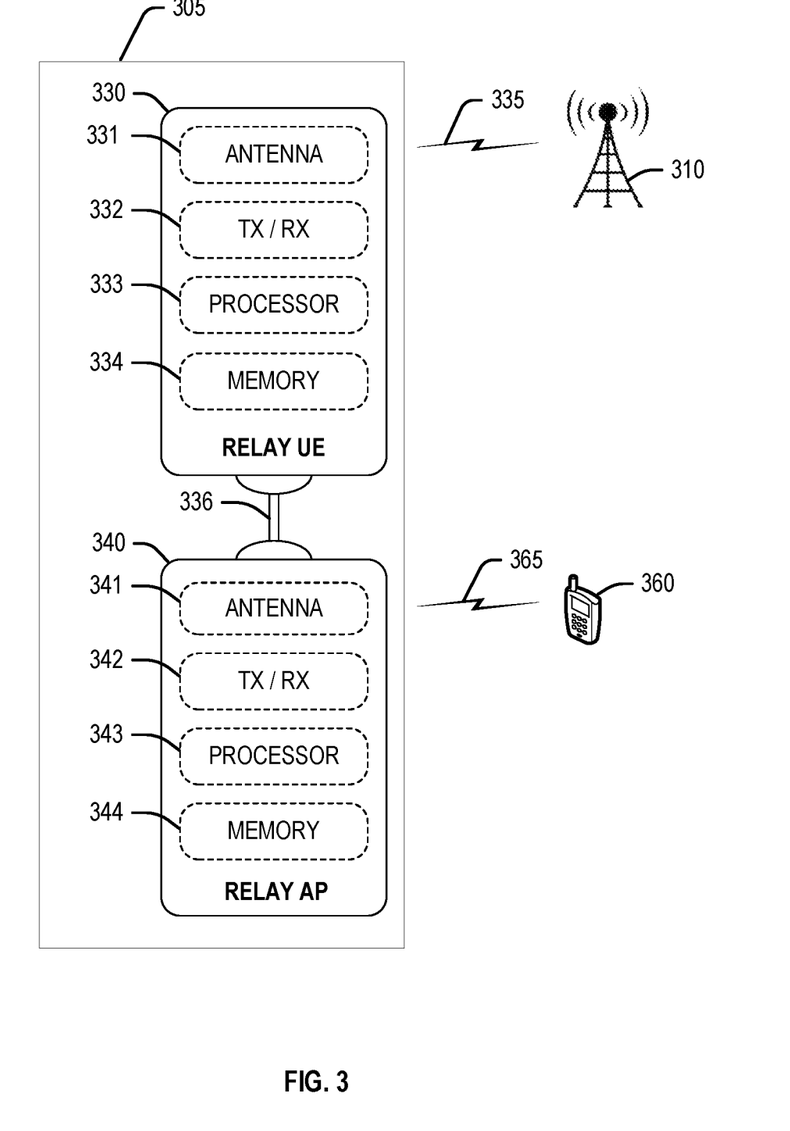
FIG. 3 depicts an exemplary relay node.

FIG. 3 depicts an exemplary relay node 305 including a relay wireless device (relay user equipment or relay UE) 330 and a separate relay access point (relay AP) 340. Relay wireless device 330 is illustrated as having an antenna 331 for direct (i.e., unrelayed) communication with donor access node 310 via a wireless backhaul link 335. Relay wireless device 330 may also include a transceiver 332, a processor 333, and a memory 334 for storing instructions that enable relay wireless device 330 to perform operations described herein. In some embodiments, relay wireless device 330 may be referred to as a customer premise equipment (CPE), which may be a stationary LTE wireless device having a stronger computational & radio frequency capability versus standard wireless devices. Relay wireless device 330 may include a directional antenna and a dedicated power supply, enabling relay wireless device 330 to efficiently provide resources to wireless device 360 via relay access point 340. In some embodiments, relay access point 340 may be co-located with relay wireless device 330, and may be connected to relay wireless device 330 via a communication interface 336. In some embodiments, relay access point 340 and relay wireless device 330 may be included in a single device. Communication interface 336 may be a suitable interface that enables communication (e.g., direct communication) between relay wireless device 330 and relay access point 340, such as USB, FireWire, Ethernet, or any other serial, parallel, analog, or digital interface. In some embodiments, relay node 305 may be configured to perform functions similarly performed by an access node (e.g., access node 210). For example, in some embodiments, relay node 305 may include a scheduler configured to schedule resources for a plurality of wireless devices connected to relay node 305.

In operation, in some embodiments, relay wireless device 330 may be configured to relay network services from donor access node 310 to wireless device 360 via relay access point 340. Relay wireless device 330 may begin to function as a relay wireless device by sending a message to donor access node 310 to indicate that wireless device 330 is functioning as a relay wireless device. In some embodiments, relay wireless device 330 may request to send a buffer status report to donor access node 310. Donor access node 310 may grant this request. Relay wireless device 330 may respond to the grant by sending a short buffer status report. This short buffer status report may be associated with a logical channel group that indicates the buffer status report is communicating the status of relay wireless device 330 as a relay, and thus is not asking for additional resource allocations (as a conventional buffer status report would indicate). In other words, when relay wireless device 330 responds with a buffer status report for the special logical channel group, it means that the buffer status report is not actually reporting the status of a buffer. Rather, this buffer status report indicates that the wireless device is functioning as a relay. Once the status of relay wireless device 330 is established, relay wireless device 330 may instruct relay access point 340 to start accepting connection requests from one or more wireless devices such as wireless device 360.

Further, based on the indication of relay status, donor access node 310 may alter how relay wireless device 330 is treated. For example, relay wireless device 330 may be provided with preferential treatment because it is functioning as a relay. In some embodiments, a specific class indicator may be assigned to wireless backhaul link 335 between relay wireless device 330 and donor access node 310. The class indicator may be a QoS Class Identifier (QCI) that is different from other QCIs assigned to wireless devices that are directly connected to donor access node 310. In other embodiments, upon determining that a resource requirement or traffic type of wireless device 360 meets a threshold or other criteria, the class indicator of wireless backhaul link 335 may be adjusted to meet the resource requirement or provide an appropriate QoS for the traffic type.

Referring to FIG. 3, relay access point 340 is illustrated as having an antenna 341 and a transceiver 342 for enabling communication with wireless device 360, a processor 343, and a memory 344 for storing instructions that are executable by processor 343. In some embodiments, relay access point 340 may be a home eNodeB. Moreover, although only one transceiver is depicted in each of relay wireless device 330 and relay access point 340, additional transceivers may be incorporated in order to facilitate communication across communication interface 336 and other network elements. In operation, relay access point 340 may be configured to deploy a carrier by the combination of antenna 341 and transceiver 342, and enable wireless device 360 to attach thereto.

Figure 4:
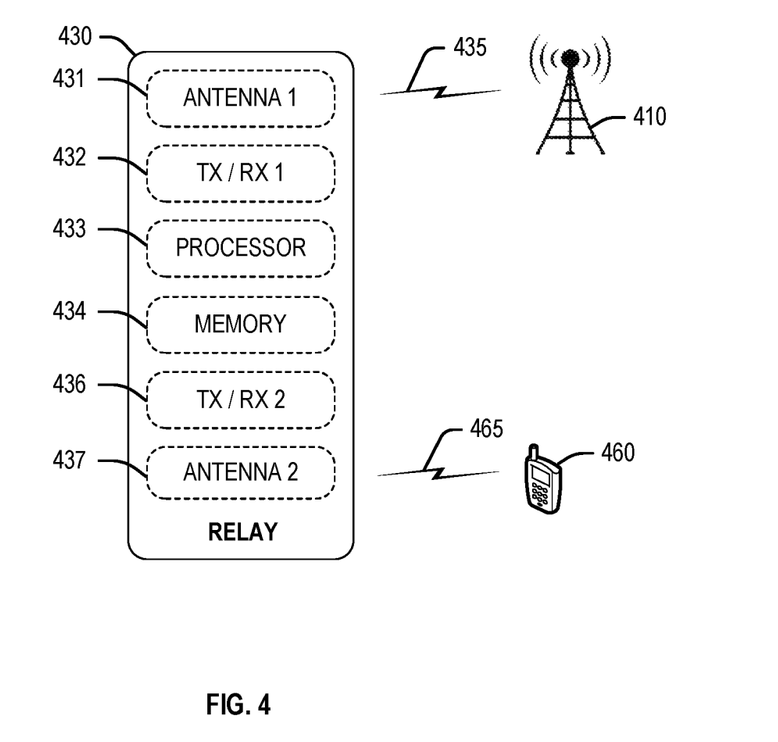
FIG. 4 depicts another exemplary relay node.

In some embodiments, a relay node may integrate components of both a relay wireless device and a relay access point into a single unit. FIG. 4 depicts an exemplary relay node 430 according to this configuration. Relay node 430 is illustrated as having a first antenna 431 for direct (i.e., unrelayed) communication with donor access node 410 via a wireless backhaul link 435. Relay node 430 may include a first transceiver 432, a processor 433, and a memory 434 for storing instructions that are executable by processor 433 as described herein. Relay node 430 further includes a second transceiver 436 and a second antenna 437 for enabling communication with wireless device 460 via a wireless link 465. Relay node 430 may perform operations disclosed herein, including those described above with respect to FIG. 3. In some embodiments, relay node 430 may be configured to perform functions similarly performed by an access node. For example, relay node 430 may include a scheduler configured to schedule resources for a plurality of wireless devices connected to the relay node.

In some embodiments, the relay nodes depicted in FIG. 3-4 may be configured to function as one or more of a layer 1 (L1), layer 2 (L2), or layer 3 (L3) relay node. An L1 relay node functions as a booster or repeater. In other words, an L1 relay node performs an amplify and forward (AF) function. RF signals received from a donor access node are amplified and transmitted to end-user wireless devices by an L1 relay node. Likewise, RF signals received from end-user wireless devices are amplified and transmitted to donor access nodes by an L1 relay node. An L2 relay node performs a decode and forward (DF) function. RF signals received from a donor access node are demodulated and decoded, then encoded, modulated, and transmitted to a wireless device by an L2 relay node. Likewise, RF signals received from a wireless device are demodulated and decoded, then encoded, modulated, and transmitted to a donor access node by an L2 relay node. An L3 relay node performs a decode and forward function. An L3 relay node also performs additional processing, such as ciphering and/or data concatenation/segmentation/reassembly. In other words, a relay node depicted herein performs demodulation and decoding of the received RF signals (either uplink or downlink), processes received data, then encodes, modulates, and transmits the data between two communication devices. In some embodiments, a relay node may include functions that are similarly performed by an access node. For example, a relay node may include a scheduler that performs resource scheduling. The scheduler may include a processor (such as processor 333, 343, or 433) configured to perform the resource scheduling functions or operations disclosed herein.

Figure 5:
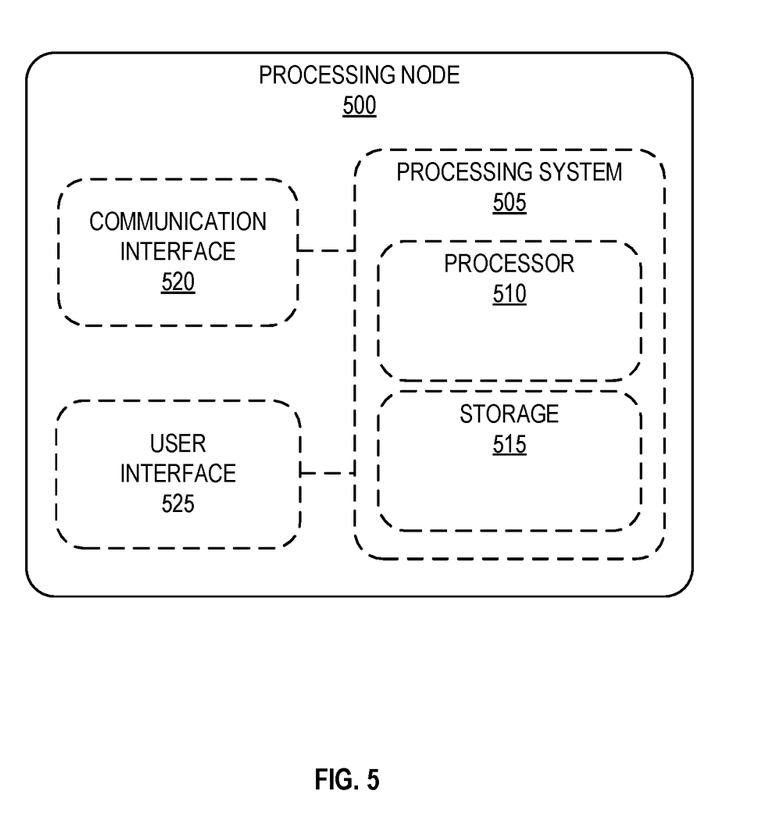
FIG. 5 depicts an exemplary processing node.

FIG. 5 depicts an exemplary processing node 500, which may be configured to perform resource scheduling functions, including the methods and operations disclosed herein. In some embodiments, processing node 500 may be included in an access node, such as access node 110, 210, 310, or 410. For example, processing node 500 may be included in a scheduler (e.g., scheduler 211) included in the access node and configured to perform resource scheduling functions. In some embodiments, processing node 500 may be included in a relay node, such as relay node 120, 130, 220 and 221, 230, 305, or 430. For example, the relay node may also include a scheduler (not shown) that performs resource scheduling functions, and processing node 500 may be included in the scheduler. In some embodiments, processing node 500 may be included in a network node or device that is separately provided from the access node or the relay node. For example, processing node 500 may be included in controller node 104 or any other network node or device.

Processing node 500 may be configured for scheduling resources for relay nodes, wireless devices, and/or access nodes in a wireless network. Processing node 500 may include a processing system 505. Processing system 505 may include a processor 510 and a storage device 515. Storage device 515 may include a disk drive, a flash drive, a memory, or other storage device configured to store data and/or computer readable instructions or codes (e.g., software). The computer executable instructions or codes maybe accessed and executed by processor 510 to perform various methods disclosed herein. Software stored in storage device 515 may include computer programs, firmware, or other form of machine-readable instructions, including an operating system, utilities, drivers, network interfaces, applications, or other type of software. For example, software stored in storage device 515 may include a module for performing resource scheduling operations described herein. Processor 510 may be a microprocessor and may include hardware circuitry and/or embedded codes configured to retrieve and execute software stored in storage device 515.

Processing node 500 may include a communication interface 520 and a user interface 525. Communication interface 520 may be configured to enable the processing system 505 to communicate with other components, nodes, or devices in the wireless network. Communication interface 520 may include hardware components, such as network communication ports, devices, routers, wires, antenna, transceivers, etc. User interface 525 may be configured to allow a user to provide input to processing node 500 and receive data or information from processing node 500. User interface 525 may include hardware components, such as tough screens, buttons, displays, speakers, etc. Processing node 500 may further include other components such as a power management unit, a control interface unit, etc., which are omitted for clarity.

Figure 6:
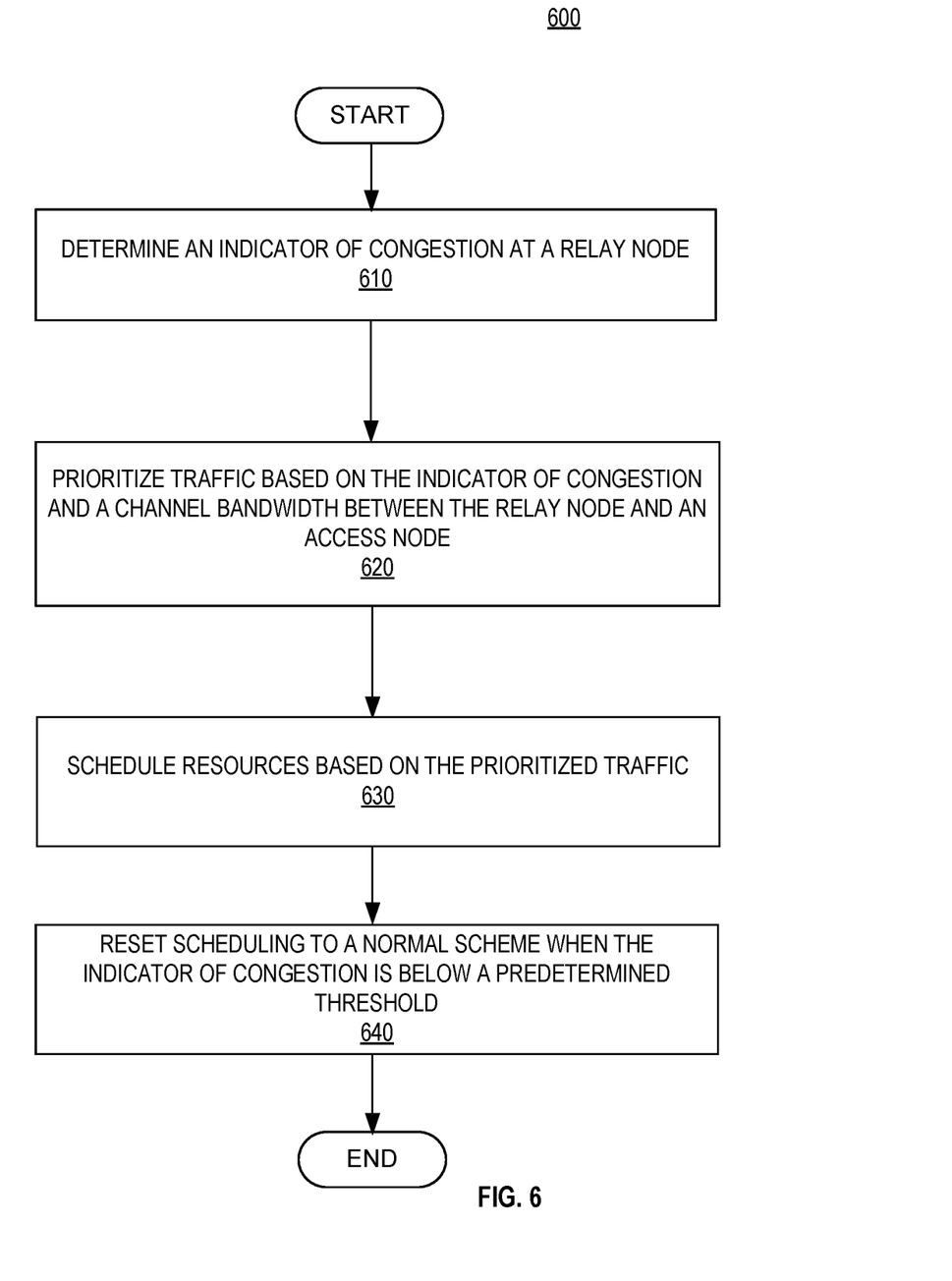
FIG. 6 depicts an exemplary method for scheduling resources for relay nodes in a wireless network.

FIG. 6 depicts an exemplary method 600 for scheduling resources for relay nodes in a wireless network. Method 600 of FIG. 6 may be implemented by a donor access node (such as donor access node 110, 210, 310, or 410), by a controller node (such as controller node 104), by a relay node (such as relay node 120, 130, 220 and 221, 230, 305, or 430), or by any other network node or device. For example, method 600 may be performed by a processor (e.g., processor 212) included in an access node (such as access node 110, 210, 310, or 410), by a processor included in the controller node 104, by a processor (e.g., processor 333, 343, or 433) included in a relay node (such as relay node 120, 130, 220 and 221, 230, 305, or 430), or by a processor included in another network node or device. In some embodiments, method 600 may be performed by scheduler 211 included in access node 210. In some embodiments, method 600 may be performed by processing node 500, such as processor 510 included in processing node 500. Although FIG. 6 depicts steps performed in a particular order for purposes of illustration and discussion, the steps discussed herein are not limited to any particular order or arrangement. One skilled in the art, using the disclosures provided herein, will appreciate that various steps of the methods can be omitted, rearranged, combined, and/or adapted in various ways.

At step 610, the processor (which may be any suitable processor disclosed herein) may determine an indicator of congestion at a relay node. For example, in some embodiments, processor 212 may determine the indicator of congestion at relay node 230 based on traffic information received from relay node 230. In some embodiments, processor 333, 343, or 433 included in relay node 305 or 430 may determine the indicator of congestion at the respective relay node. The indicator of congestion may be determined based on a channel bandwidth between the relay node and the access node. For example, the channel bandwidth may be related to a fixed, assigned number of physical resource blocks (PRBs). In some embodiments, the channel bandwidth may be 1.25 MHz, 2.5 MHz, 5 MHz, 10 MHz, 15 MHz, or 20 MHz, and the related assigned number of PRBs may be 6 PRBs, 12 PRBs, 25 PRBs, 50 PRBs, 75 PRBs, and 100 PRBs, respectively. In some embodiments, the indicator of congestion may include a difference between the number of PRBs needed at the relay node and the assigned number of PRBs. When the difference between the number of PRBs that are needed and the assigned number of PRBs is greater than a predetermined threshold (such as 5 PRBs or any other suitable number), the indicator (e.g., the difference) may indicate that the traffic at the relay node is highly congested (or having a high level of congestion) or congested. When the difference is smaller than or equal to the predetermined threshold (such as 5 PRBs), the indicator may indicate that the traffic at the relay node is not congested or has a low level of congestion.

In some embodiments, the indicator of congestion may be determined based on a number of actively connected wireless devices at the relay node. For example, one hundred wireless devices may be connected with the relay node 430, among which some (e.g., thirty) may be in an idle state, and some (e.g., seventy) may be actively connected (e.g., they may have active voice calls, website browsing, videos or music streaming, or active video conference calls). When the number of actively connected wireless devices is greater than a predetermined threshold (e.g., greater than sixty), the indicator may indicate that the traffic at relay node 430 is congested or highly congested. Otherwise, when the number of actively connected wireless devices is lower than or equal to the predetermined threshold, the indicator may indicate that the traffic at relay node 430 is not congested or the congestion level is low.

At step 620, the processor may prioritize traffic (e.g., data traffic) at the relay node based on the indicator of congestion and the channel bandwidth between the relay node and the access node. In some embodiments, method 600 is performed when the channel bandwidth is small (e.g., 1.25 MHz, 2.5 MHz, or 5 MHz) and the level of congestion is high (e.g., the difference between the number of PRBs that are needed and the assigned number of PRBs is higher than, for example, 5 PRBs). For example, the processor may assign higher priority to GBR related traffic over non-GBR related traffic, even when certain non-GBR related traffic may have a default priority higher than the default priority of certain GBR related traffic. In some embodiments, the indicator of congestion may include a number of PRBs needed at the relay node. The processor may compare the number of PRBs needed at the relay node with the channel bandwidth. Specifically, the processor may compare the number of PRBs needed at the relay node with assigned number of PRBs associated with the channel bandwidth, as further discussed below in connection with FIG. 7. The processor may prioritize traffic based on the comparison between the assigned number of PRBs and the number of PRBs needed at the relay node.

At step 630, the processor may schedule resources based on the prioritized traffic. For example, the processor may allocate a greater number of PRBs to traffic that has a higher priority, such as GBR related traffic.

At step 640, the processor may reset the scheduling to a normal scheme when the indicator of congestion is below a predetermined threshold. For example, when the indicator of congestion indicates that the number of PRBs needed at the relay node is less than the number of PRBs assigned to the relay node corresponding to the channel width, or that the number of actively connected wireless devices at the relay node is less than a predetermined number, the processor may reset the scheduling to a normal scheme (e.g., a scheme that prioritizes traffic according to the default priority of the traffic) for scheduling the resources to the relay node.

Figure 7:
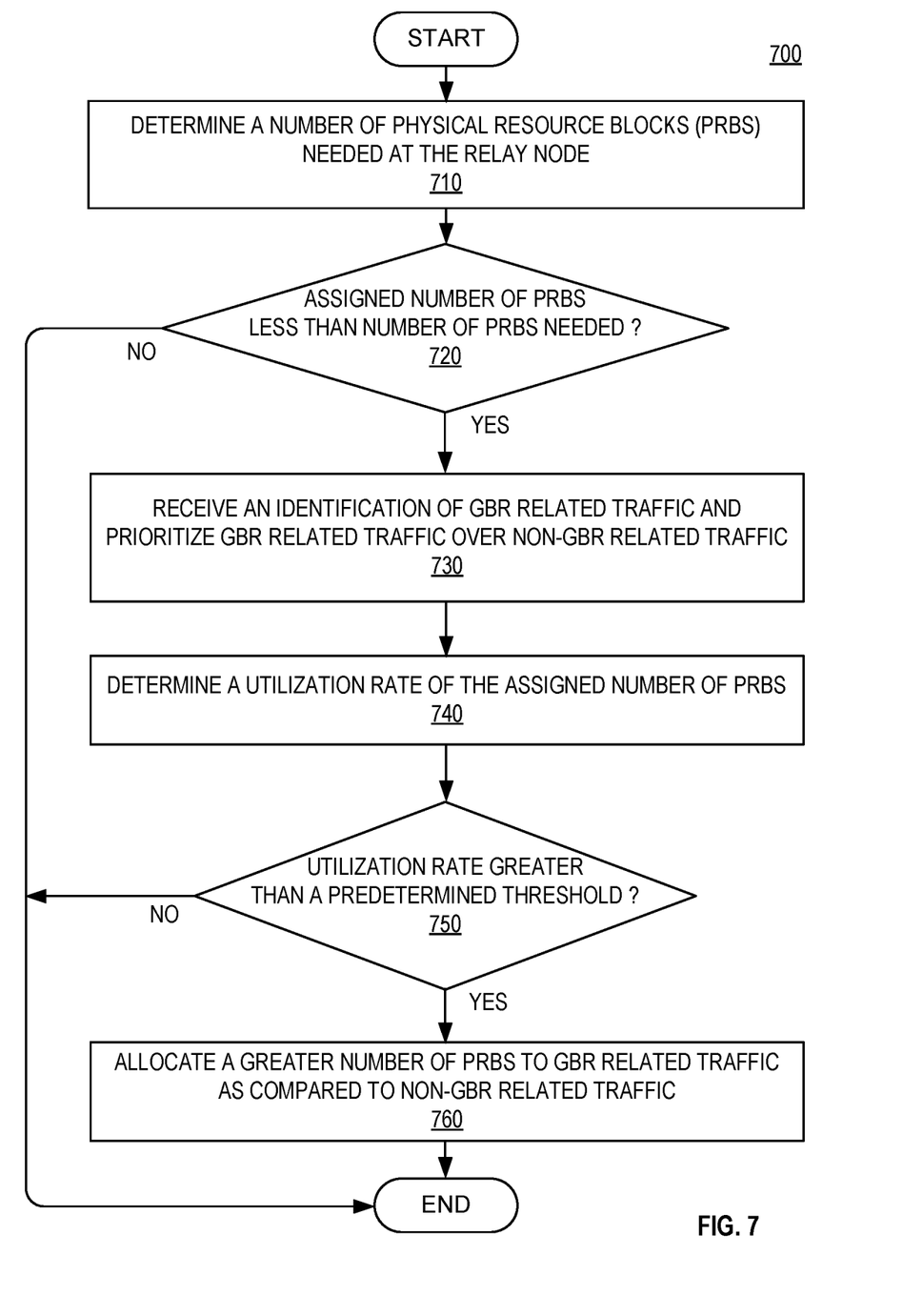
FIG. 7 depicts additional details of the exemplary method for scheduling resources for relay nodes shown in FIG. 6.

FIG. 7 depicts an exemplary method 700 for scheduling resources for relay nodes in a wireless network. Method 700 may include additional details of method 600 shown in FIG. 6. Method 700 of FIG. 7 may be implemented by a donor access node (such as donor access node 110, 210, 310, or 410), by a controller node (such as controller node 104), by a relay node (such as relay node 120, 130, 220 and 221, 230, 305, or 430), or by any other network node or device. For example, method 700 may be performed by a processor (e.g., processor 212) included in the access node (such as access node 110, 210, 310, or 410), by a processor included in the controller node 104, by a processor (e.g., processor 333, 343, or 433) included in the relay node (such as relay node 120, 130, 220 and 221, 230, 305, or 430), or by a processor included in another network node or device. In some embodiments, method 700 may be performed by scheduler 211 included in access node 210. In some embodiments, method 700 may be performed by processing node 500, such as processor 510 included in processing node 500. As discussed above, processing node 500 may be included in any of the access nodes, relay nodes, controller node discussed above, or any other separate network nodes or devices. Although FIG. 7 depicts steps performed in a particular order for purposes of illustration and discussion, the steps discussed herein are not limited to any particular order or arrangement. One skilled in the art, using the disclosures provided herein, will appreciate that various steps of the methods can be omitted, rearranged, combined, and/or adapted in various ways.

At step 710, the processor may determine a number of physical resource blocks (PRBs) needed at the relay node. For example, in some embodiments, based on traffic report or requests for resources received from the relay node, the processor included in the access node may determine the number of PRBs needed at the relay node. Alternatively, a processor at a relay node may determine the number of PRBs needed at the relay node. This step may be part of an embodiment of step 610 of method 600.

At step 720, the processor may compare an assigned number of PRBs associated with a channel width between the relay node and the access node with the number of PRBs needed at the relay node, and determine whether the assigned number of PRBs is less than the number of PRBs needed at the relay node (or whether a difference between the PRBs needed at the relay node and the assigned number of PRBs is greater than a predetermined threshold, such as 5 PRBs). This step may be part of an embodiment of step 610 of method 600. If the assigned number of PRBs is not less than (i.e., greater than or equal to) the number of PRBs needed at the relay node ("NO" at step 720), the processor skips steps 730-760. This may indicate that the relay node is not congested or the congestion level is not high.

If the assigned number of PRBs is less than the number of PRBs needed at the relay node (or the difference is greater than the predetermined threshold) ("YES" at step 720), which may indicate that the congestion level at the relay node is high, the processor may receive an identification of GBR related traffic and prioritize the GBR related traffic over non-GBR related traffic (step 730). This may be part of an embodiment of step 620 of method 600. In some embodiments, when the processor is a processor included in the access node (e.g., processor 212 included in scheduler 211 of access node 210) or any other network node or device other than the relay node, the identification of GBR related traffic may be received by the access node or another network node or device from the relay node. In some embodiments, when the processor is a processor included in the relay node that performs the traffic prioritization and resource allocation or scheduling functions, the step of receiving an identification of the GBR related traffic may be replaced by a step of identifying GBR related traffic. The processor included in the relay node may identify GBR related traffic and non-GBR related traffic based on traffic information at the relay node. GBR related traffic and non-GBR related traffic each has a default priority level (e.g., 0.5, 1, 2, etc., smaller number indicating higher priority). When prioritizing the GBR related traffic over non-GBR related traffic, the processor may assign a higher priority level to GBR related traffic, even when certain non-GBR related traffic has a higher default priority level than certain GBR related traffic. Examples of GBR related traffic include conversational voice, conversational video (e.g., live streaming), real time gaming, etc. Examples of non-GBR related traffic includes IMS signaling, buffered streaming, web browsing, interactive gaming, email, chat, etc.

At step 740, the processor may determine a utilization rate of the assigned number of PRBs. For example, the assigned channel bandwidth between the access node and the relay node may be 5 MHz, which may correspond to 25 PRBs. At a certain time, not all 25 PRBs may be actually utilized. For example, only 15 PRBs may be utilized by the relay node at certain time. In this example, a utilization rate is 15/25=0.75 or 75%.

At step 750, the processor may determine whether the utilization rate is greater than a predetermined threshold. The predetermined threshold for the utilization rate may be any suitable rate, for example, 75%, 80%, 90%, etc. If the utilization rate is not greater than (i.e., less than or equal to) the predetermined threshold ("NO," step 750), the processor does not execute step 760. If the utilization rate is greater than the predetermined threshold ("YES," step 750), the processor may allocate a greater number of PRBs to GBR related traffic as compared to non-GBR related traffic (step 760). Step 760 may be part of an embodiment of step 630 of method 600. For example, the processor may allocate a greater number of PRBs for GBR related traffic to use, even when GBR related traffic may have a default priority level that is lower than the default priority level of certain non-GBR related traffic.

Figure 8:
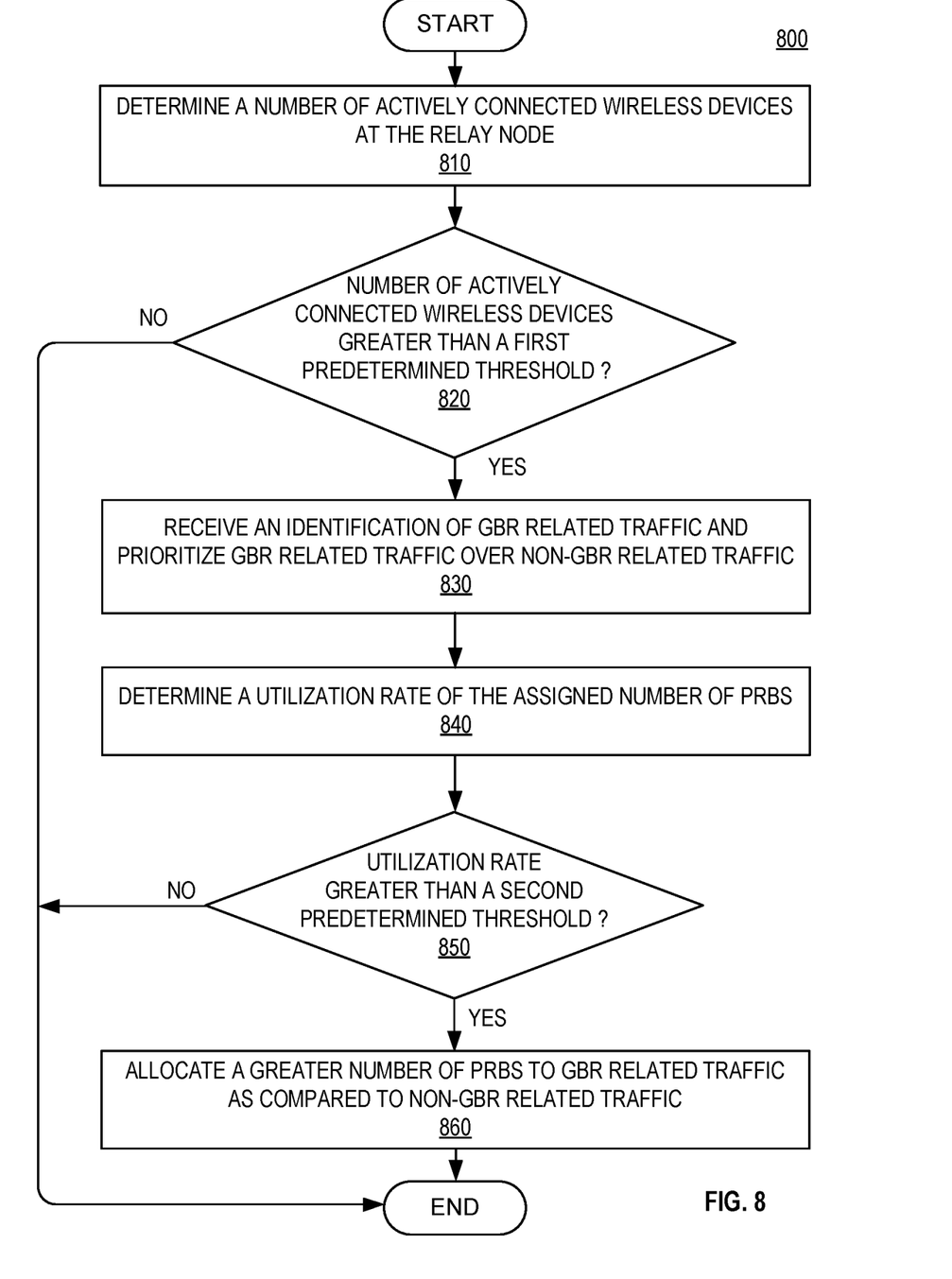
FIG. 8 depicts additional details of the exemplary method for scheduling resources for relay nodes shown in FIG. 6.

FIG. 8 depicts an exemplary method 800 for scheduling resources for relay nodes in a wireless network. Method 800 may include additional details of method 600 shown in FIG. 6. Method 800 of FIG. 8 may be implemented by a donor access node (such as donor access node 110, 210, 310, or 410), by a controller node (such as controller node 104), by a relay node (such as relay node 120, 130, 220 and 221, 230, 305, or 430), or by any other network node or device. For example, method 800 may be performed by a processor (e.g., processor 212) included in the access node (such as access node 110, 210, 310, or 410), by a processor included in the controller node 104, by a processor (e.g., processor 333, 343, or 433) included in the relay node (such as relay node 120, 130, 220 and 221, 230, 305, or 430), or by a processor included in another network node or device. In some embodiments, method 800 may be performed by scheduler 211 included in access node 210. In some embodiments, method 800 may be performed by processing node 500, such as processor 510 included in processing node 500. As discussed above, processing node 500 may be included in any of the access nodes, relay nodes, controller node discussed above, or any other separate network nodes or devices. Although FIG. 8 depicts steps performed in a particular order for purposes of illustration and discussion, the steps discussed herein are not limited to any particular order or arrangement. One skilled in the art, using the disclosures provided herein, will appreciate that various steps of the methods can be omitted, rearranged, combined, and/or adapted in various ways.

At step 810, the processor may determine a number of actively connected wireless devices at the relay node. This may be part of an embodiment of step 610 of method 600. For example, in some embodiments, based on traffic report received from the relay node, the processor included in the access node may determine the number of actively connected wireless devices at the relay node. Alternatively, the processor included in the relay node may determine the number of actively connected wireless devices.

At step 820, the processor may compare the number of actively connected wireless devices at the relay node with a first predetermined threshold. This step may be part of an embodiment of step 610 of method 600. The first predetermined threshold for comparing with the number of actively connected wireless devices may be any suitable number, for example, 10 devices, 20 devices, 50 devices, 100 devices, etc. The processor may determine whether the number of actively connected wireless devices is greater than the first predetermined threshold. If the number of actively connected wireless devices is not greater than (i.e., less than or equal to) the first predetermined threshold ("NO" at step 820), the processor skips steps 830-860. This may indicate that the relay node is not congested or not highly congested.

If the number of actively connected wireless devices at the relay node is greater than the first predetermined threshold ("YES" at step 820), which may indicate that the traffic at the relay node is congested or highly congested, the processor may receive an identification of GBR related traffic and prioritize the GBR related traffic over non-GBR related traffic (step 830). This may be part of an embodiment of step 620 of method 600. In some embodiments, when the processor is a processor included in the access node (e.g., processor 212 included in scheduler 211 of access node 210) or any other network node or device other than the relay node, the identification of GBR related traffic may be received by the access node or another network node or device from the relay node. In some embodiments, when the processor is a processor included in the relay node that performs the traffic prioritization and resource allocation or scheduling functions, the step of receiving an identification of the GBR related traffic may be replaced by a step of identifying GBR related traffic. GBR related traffic and non-GBR related traffic each has a default priority level (e.g., 0.5, 1, 2, etc., smaller number indicating higher priority). When prioritizing the GBR related traffic over non-GBR related traffic, the processor may assign a higher priority level to GBR related traffic, even when certain non-GBR related traffic has a higher default priority level.

At step 840, the processor may determine a utilization rate of assigned number of PRBs corresponding to the assigned channel bandwidth between the relay node and the access node. For example, the assigned channel bandwidth between the access node and the relay node may be 5 MHz, which may correspond to 25 PRBs. At a certain time, not all 25 PRBs may be actually utilized. For example, only 15 PRBs may be utilized by the relay node at certain time. In this example, a utilization rate is 15/25=0.75 or 75%.

At step 850, the processor may determine whether the utilization rate is greater than a second predetermined threshold. The second predetermined threshold for the utilization rate may be any suitable rate, for example, 75%, 80%, 90%, etc. If the utilization rate is not greater than (i.e., less than or equal to) the second predetermined threshold ("NO," step 850), the processor does not execute step 860. If the utilization rate is greater than the second predetermined threshold ("YES," step 850), the processor may allocate a greater number of PRBs to GBR related traffic as compared to non-GBR related traffic (step 860). This may be part of an embodiment of step 630 of method 600. For example, the processor may allocate a greater number of PRBs for GBR related traffic to use, even when certain GBR related traffic may have a default priority level that is lower than the default priority level of certain non-GBR related traffic.

In some embodiments, the processor may determine a rate of change of PRB utilization rate at the relay node. As the PRB utilization rate increases, for example, from 70% to 75%, or decreases, for example, from 80% to 70%, the processor may take into account the rate of change of the PRB utilization rate, and make scheduling priority decisions based on the rate of change of the PRB utilization rate. For example, in an environment where the load is increasing at the relay node, if the threshold for prioritizing GBR over non-GBR traffic (e.g., as used in step 750 or 850) is initially set at 75% PRB utilization rate, the processor may adjust the initial threshold to a lower threshold (e.g., to 60%) if the rate of change of the PRB utilization rate is higher than a rate of change threshold. For example, if the rate of change of the PRB utilization rate is 10% per minute, and is higher than a rate of change threshold (e.g., 5% per minute), then the processor may adjust the initial threshold for prioritization GBR related traffic by reducing the threshold from 75% to 60%. Similarly, the threshold for prioritizing GBR related traffic could be adjusted higher if the rate of change of the PRB utilization rate is lower than a rate of change threshold. For example, if the rate of change of the PRB utilization rate is 2% per minute, lower than a rage of change threshold (e.g., 5% per minute), then the processor may adjust the initial threshold of 75% to be higher, e.g., 80%. Similar adjustments to the threshold for prioritizing GBR related traffic may be applied when the load is decreasing at the relay node. For example, when the rate of decrease (e.g., decreasing at 10% per minute) of the PRB utilization rate is greater than a predetermined threshold (e.g., 5% per minute), the processor may increase the initial threshold for prioritizing the GBR related traffic. When the rate of decrease of the PRB utilization rate is smaller than the predetermined threshold, the processor may reduce the initial threshold for prioritizing the GBR related traffic.

The methods 600, 700, and 800 may include other additional or alternative operations. For example, the processor may dynamically assign the channel bandwidth between the relay node and the access node based on the prioritized traffic. In some embodiments, the access node may collect traffic information from a plurality of relay nodes that are connected to the access node. If one of the relay nodes includes more GBR related traffic than other relay nodes, the access node may assign a larger channel bandwidth to the relay node (e.g., changing the 5 MHz bandwidth assigned to the relay node to 10 MHz). In some embodiments, the access node may determine a percentage by dividing the amount of prioritized traffic (e.g., amount of GBR related traffic) at a relay node by a total amount of GBR related traffic at other relay nodes and at the access node (e.g., when there are end-user wireless devices directly connected to the access node). The access node may determine a percentage for each relay node, and may allocate the available channel bandwidths based on the percentage for each relay node. For example, when the GBR related traffic at a relay node takes 15% of the total GBR related traffic in the network of the access node, the access node may adjust the channel bandwidth for the relay node by, e.g., assigning a larger or smaller channel bandwidth to the relay node to approximately reflect the percentage. In some embodiments, the access node may rank the relay nodes based on their respective percentages of GBR related traffic, and may assign available channel bandwidths to the relay nodes based on the ranking. For example, the relay node with the highest ranking may be assigned with the largest channel bandwidth, and the relay node with the lowest ranking may be assigned with the smallest channel bandwidth.

In some embodiments, the access node may dynamically assign the channel bandwidth between the access node and a relay node based on both the prioritized traffic at the relay node and the traffic at the access node (e.g., wireless devices directly linked to the access node). The access node may dynamically adjust the channel bandwidth assigned to a relay node as the traffic at the access node and the traffic at the relay node change. For example, when the traffic at the access node is low and the traffic at the relay node is high, the access node may assign more bandwidth to the relay node such that the prioritized traffic may be processed first. When the traffic at the access node is high and the traffic at the relay node is low, the access node may assign less bandwidth to the relay node and more bandwidth to the wireless devices that are directly connected to the access node.

The exemplary systems and methods described herein may be performed under the control of a processing system executing computer-readable codes embodied on a computer-readable recording medium or communication signals transmitted through a transitory medium. The computer-readable recording medium may be any data storage device that can store data readable by a processing system, and may include both volatile and nonvolatile media, removable and non-removable media, and media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A system for scheduling resources in a wireless network, the system comprising:
   an access node configured to deploy a first radio air interface;
   a relay node configured to attach to the first radio air interface and to deploy a second radio air interface to which one or more end-user wireless devices are attached; and
   a processor configured to perform operations comprising:
      determining an indicator of congestion at the relay node;
      prioritizing Guaranteed Bit Rate (GBR) related traffic over non-GBR related traffic based on the indicator of congestion and a channel bandwidth between the relay node and the access node; and
      scheduling resources based on the prioritized traffic, wherein greater resources are scheduled for GBR related traffic than non-GBR related traffic.

2. The system of claim 1,
wherein determining the indicator of congestion comprises determining a number of physical resource blocks needed at the relay node, and
wherein the operations further comprise:
comparing the number of physical resource blocks needed at the relay node with an assigned number of physical resource blocks associated with the channel bandwidth between the relay node and the access node; and
when the assigned number of physical resource blocks associated with the channel bandwidth between the relay node and the access node is less than the number of physical resource blocks needed at the relay node, receiving an identification of GBR related traffic.

3. The system of claim 2, wherein the operations further comprise:
determining a utilization rate of the assigned number of physical resource blocks; and
when the utilization rate is greater than a predetermined threshold, allocating a greater number of physical resource blocks to the GBR related traffic as compared to the non-GBR related traffic.

4. The system of claim 2, wherein receiving the identification of the GBR related traffic comprises receiving the identification from the relay node.

5. The system of claim 1,
wherein determining the indicator of congestion comprises determining a number of actively connected end-user wireless devices at the relay node, and
wherein the operations further comprises when the number of actively connected end-user wireless devices is greater than a first predetermined threshold, receiving an identification of GBR related traffic.

6. The system of claim 5,
wherein the operations further comprise determining a utilization rate of an assigned number of physical resource blocks associated with the channel bandwidth, and
when the utilization rate is greater than a second predetermined threshold, allocating a greater number of physical resource blocks to the GBR related traffic as compared to the non-GBR related traffic.

7. The system of claim 1,
wherein the processor is included in a scheduler of the access node.

8. The system of claim 1,
wherein the processor is included in the relay node.

9. The system of claim 1,
wherein the processor is included in a processing node separated from the access node and the relay node, and communicatively coupled with at least one of the access node and the relay node.

10. The system of claim 1, wherein scheduling resources based on the prioritized traffic comprises allocating physical resource blocks based on the prioritized traffic.

11. The system of claim 1, wherein scheduling resources based on the prioritized traffic comprises dynamically assigning the channel bandwidth between the relay node and the access node based on the prioritized traffic.

12. The system of claim 1, wherein the operations further comprise determining traffic at the access node, and dynamically assigning the channel bandwidth between the relay node and the access node based on the prioritized traffic at the relay node and the traffic at the access node.

13. A method for scheduling resources in a wireless network, the method comprising:
determining an indicator of congestion at a relay node;
prioritizing Guaranteed Bit Rate (GBR) related traffic over non-GBR related traffic based on the indicator of congestion and a channel bandwidth between the relay node and an access node; and
scheduling resources based on the prioritized traffic, wherein greater resources are scheduled for GBR related traffic than non-GBR related traffic.

14. The method of claim 13, wherein determining the indicator of congestion comprises determining a number of physical resource blocks needed at the relay node, and the method further comprises:
comparing the number of physical resource blocks needed at the relay node with an assigned number of physical resource blocks associated with the channel bandwidth between the relay node and the access node; and
when the assigned number of physical resource blocks associated with the channel bandwidth between the relay node and the access node is less than the number of physical resource blocks needed at the relay node, receiving an identification of GBR related traffic.

15. The method of claim 14, further comprising:
determining a utilization rate of the assigned number of physical resource blocks; and
when the utilization rate is greater than a predetermined threshold, allocating a greater number of physical resource blocks to the GBR related traffic as compared to the non-GBR related traffic.

16. The method of claim 14, wherein receiving the identification of the GBR related traffic comprises receiving the identification from the relay node.

17. The method of claim 13,
wherein determining the indicator of congestion comprises determining a number of actively connected end-user wireless devices at the relay node, and
wherein the method further comprises when the number of actively connected end-user wireless devices is greater than a first predetermined threshold, receiving an identification of GBR related traffic.

18. The method of claim 13, wherein scheduling resources based on the prioritized traffic comprises allocating physical resource blocks based on the prioritized traffic.

19. A processing node for scheduling resources for relay nodes in a wireless network, the processing node being configured to perform operations comprising:
determining an indicator of congestion at a relay node;
prioritizing Guaranteed Bit Rate (GBR) related traffic over non-GBR related traffic based on the indicator of congestion and a channel bandwidth between the relay node and an access node; and
scheduling resources based on the prioritized traffic, wherein greater resources are scheduled for GBR related traffic than non-GBR related traffic.

20. The processing node of claim 19, wherein determining the indicator of congestion comprises determining a number of physical resource blocks needed at the relay node, and the operations further comprise:
comparing the number of physical resource blocks needed at the relay node with an assigned number of physical resource blocks associated with the channel bandwidth between the relay node and the access node; and when the assigned number of physical resource blocks associated with the channel bandwidth between the relay node and the access node is less than the number of physical resource blocks needed at the relay node, receiving an identification of GBR related traffic.

* * * * *